(12) United States Patent
Momirov

(10) Patent No.: US 6,320,859 B1
(45) Date of Patent: Nov. 20, 2001

(54) EARLY AVAILABILITY OF FORWARDING CONTROL INFORMATION

(75) Inventor: Milan Momirov, San Francisco, CA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/036,374

(22) Filed: Mar. 6, 1998

Related U.S. Application Data

(60) Provisional application No. 60/063,814, filed on Oct. 31, 1997, provisional application No. 60/063,813, filed on Oct. 31, 1997, and provisional application No. 60/063,785, filed on Oct. 31, 1997.

(51) Int. Cl.$^7$ .................................................. H04L 12/28
(52) U.S. Cl. ......................... 370/395; 370/466; 370/473
(58) Field of Search ..................................... 370/395, 389, 370/396, 397, 351, 352, 390, 428, 473, 474, 466

(56) References Cited

U.S. PATENT DOCUMENTS

| | | | |
|---|---|---|---|
| 5,459,724 | * 10/1995 | Jeffrey et al. ........................... | 370/60 |
| 5,905,725 | * 5/1999 | Sindhu et al. ........................ | 370/389 |
| 6,067,595 | * 5/2000 | Lindenstruth et al. .............. | 710/129 |

* cited by examiner

*Primary Examiner*—Chau Nguyen
*Assistant Examiner*—Alexander D. Boakye

(74) *Attorney, Agent, or Firm*—Blakely Sokoloff Taylor & Zafman LLP

(57) ABSTRACT

A method and apparatus for increasing the throughput and forwarding rate of a switch fabric are provided. According to one aspect of the present invention, a packet forwarding device includes a plurality of port interface devices (PIDs), memory access circuitry, and a management device. The PIDs are configured to fragment packets into cells. A portion of a cell serves as forwarding information. The memory access circuitry receives cell data from the PIDs to receive cell data. The memory access circuitry includes a data interface that outputs cell data and an independent control interface that outputs forwarding information. A memory is coupled to the data interface of the memory access circuitry to temporarily store the cell data received from the memory access circuitry. A management device is coupled to the independent control interface of the memory access circuitry to receive the forwarding information. The management device employs the forwarding information to organize cells into one or more groups. According to another aspect of the present invention, a method is provided for forwarding data through a network device. A first port interface receives a packet. The first port interface transfers a cell, including data from the packet and forwarding information associated with the packet, to an intermediate device. The intermediate device outputs the cell to a memory via a data path and outputs the forwarding information to a queue managing device via a separate and independent control path. Based upon the forwarding information, an output queue with which to associate the cell may be determined. Ultimately, the cell is transferred to a second port interface device associated with the output queue.

22 Claims, 5 Drawing Sheets

| CELL BIT | SWITCH SRAM BIT | CELL HEADER -300- | |
|---|---|---|---|
| 0 | 0 | PARITY SLICE OVER BITS 7:0 | |
| 1 | 1 | PAYLOAD LENGTH BIT 0. PAYLOAD DWORDS-1. ONLY VALID AT END OF PACKET. | |
| 2 | 2 | PAYLOAD LENGTH BIT 1. | |
| 3 | 3 | PAYLOAD LENGTH BIT 2. | |
| 4 | 4 | PAYLOAD LENGTH BIT 3. | 410 |
| 5 | 5 | DESTINATION ADDRESS BIT 0. IF UNICAST: QUID PORT NUMBER BIT 0. | |
| 6 | 6 | COPY CELL TO MIRROR PORT(S) 1 => A COPY OF THE CELL IS SENT TO ALL MIRROR PORTS | |
| 7 | 7 | CELL PRIORITY 1 => HIGH PRIORITY. | |
| 8 | 64 | PARITY SLICE OVER BITS 15:8 | |
| 9 | 65 | SOURCE PORT NUMBER BIT 0. (QUID PORT NUMBER BIT 0) | |
| 10 | 66 | SOURCE PORT NUMBER BIT 1. (QUID PORT NUMBER BIT 1) | |
| 11 | 67 | <RESERVED> | 420 |
| 12 | 68 | PACKET ERROR. 1=> PACKET ERROR DETECTED BY THE RECEIVE MAC | |
| 13 | 69 | DESTINATION ADDRESS BIT 1. IF UNICAST: QUID PORT NUMBER BIT 1. | |
| 14 | 70 | DESTINATION ADDRESS BIT 3. IF UNICAST: QUID NUMBER BIT 1. | |
| 15 | 71 | DESTINATION ADDRESS BIT 4. IF UNICAST: QUID NUMBER BIT 2. | |
| 16 | 128 | PARITY SLICE OVER BITS 23:16 | |
| 17 | 129 | START OF PACKET. | |
| 18 | 130 | SOURCE PORT NUMBER BIT 2. (QUID NUMBER BIT 0) | |
| 19 | 131 | SOURCE PORT NUMBER BIT 3. (QUID NUMBER BIT 1) | |
| 20 | 132 | SOURCE PORT NUMBER BIT 4. (QUID NUMBER BIT 2) | 430 |
| 21 | 133 | DESTINATION ADDRESS BIT 2. IF UNICAST: QUID NUMBER BIT 0. | |
| 22 | 134 | DESTINATION ADDRESS BIT 5. IF UNICAST: QUID NUMBER BIT 3. | |
| 23 | 135 | DESTINATION ADDRESS BIT 6. IF UNICAST: QUID NUMBER BIT 4. | |
| 24 | 192 | PARITY SLICE OVER BITS 31:24 | |
| 25 | 193 | <RESERVED> | |
| 26 | 194 | SOURCE PORT NUMBER BIT 5. (QUID NUMBER BIT 3) | |
| 27 | 195 | SOURCE PORT NUMBER BIT 6. (QUID NUMBER BIT 4) | |
| 28 | 196 | OVERRIDE SAME-SEGMENT DISCARD. 1=>CELL MAY EXIT THROUGH PORT OF ENTRY. | 440 |
| 29 | 197 | END OF PACKET. | |
| 30 | 198 | COPY CELL TO SYSTEM QUID. 1=>A COPY OF THE CELL IS SENT TO SQUID PORT 1 | |
| 31 | 199 | MULTICAST DESTINATION. 1=>MULTICAST DESTINATION. 0=>PHYSICAL DESTINATION. | |

FIG. 4

EARLY AVAILABILITY OF FORWARDING CONTROL INFORMATION

This application claims the benefit of U.S. Provisional Application No. 60/063,785, U.S. Provisional Application No. 60/063,814, and U.S. Provisional Application No. 60/063,813 all filed Oct. 31, 1997.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking devices. More particularly, the invention relates to a pipelining mechanism which provides for the early availability of switching information for purposes of increasing switch fabric throughput.

2. Description of the Related Art

With Local Area Network (LAN) switches now operating at data transfer rates of up to 1 Gigabit per second (Gbps), switching capacity in terms of switch fabric throughput is of critical importance.

As used herein, the terms Ethernet, Fast Ethernet, and Gigabit Ethernet shall apply to Local Area Networks (LANs) employing Carrier Sense, Multiple Access with Collision Detection (CSMA/CD) as the medium access method, generally operating at a signaling rate of 10 Megabits per second (Mbps), 100 Mbps, and 1,000 Mbps, respectively over various media types and transmitting Ethernet formatted or Institute of Electrical and Electronic Engineers (IEEE) standard 802.3 formatted data packets.

With reference to the simplified block diagram of FIG. 1, an approach for managing access to a switch memory will now briefly be described. Switch 100 includes a switch memory 110 coupled to a plurality of port interfaces 105–108 and a memory manager 115. The switch memory 110 may temporarily buffer packets received from the port interfaces 105–108 until the one or more ports to which the packets are destined are prepared to transmit the data. In this example, the memory manager 115 may coordinate the allocation of portions (buffers) of the switch memory 110 for packet storage and maintain a mapping of some sort to associate the buffers with a port (e.g., the source or destination port). That is, the buffers of the switch memory 110 may be physically or logically organized to facilitate data storage and retrieval. In any event, the memory manager 115 may additionally arbitrate the interface between the port interfaces 105–108 and the switch memory 110. For instance, the memory manager 115 may employ various mechanisms to determine which of the port interfaces 105–108 have data to transfer into the switch memory, which of the port interfaces 105–108 are prepared to receive data from the switch memory, and which port interface 105–108 may access the switch memory 110 during a particular clock cycle.

In order to maintain the integrity of the physical or logical organization of the switch memory 110, it is typically necessary for the memory manager 115 to examine a portion of the packet (e.g., the source or destination port, and/or other packet forwarding control information) prior to storing the packet data in the switch memory 110. For example, the memory manager may need to determine where to store the packet data based upon the packet's contents and if space is available in the particular physical or logical bin to which the packet data maps. Therefore, the memory manager 115 is provided with access to a subset, M, of the N data lines comprising data bus 120. In this manner, the memory manager 115 may determine the appropriate processing required for storing the packet data on data bus 120.

Several difficulties arise using the above switch memory access approach. For instance, the processing required to be performed by the memory manager 115 on the portion of the packet may require more than one memory clock cycle to complete. If this is the case, two options would appear to be available in this switch architecture. The first option is to slow down the memory clock relative to the clock domain of the memory manager 115 such that the memory manager 115 is able to complete its worst case processing within a memory clock cycle. The second option is to simply read the packet data twice, once to provide the packet data to the memory manager 115 and a second time, after the memory manager 115 has completed its processing, to transfer the packet data from the port interface 105–108 to the switch memory 110. However, both of these options result in the inefficient utilization of the data bus 120. Consequently, the packet forwarding rate through the switch memory 110 is negatively impacted.

BRIEF SUMMARY OF THE INVENTION

A method and apparatus for increasing the throughput and forwarding rate of a switch fabric are described. According to one aspect of the present invention, a packet forwarding device includes a plurality of port interface devices (PIDs), memory access circuitry, and a management device. The PIDs are configured to fragment packets into cells. A portion of a cell serves as forwarding information. The memory access circuitry is coupled to the PIDs to receive cell data. The memory access circuitry includes a data interface that outputs the cell data and an independent interface that outputs the forwarding information. A memory is coupled to the data interface of the memory access circuitry to temporarily store the cell data received from the memory access circuitry. A management device is coupled to the independent interface of the memory access circuitry to receive the forwarding information. The management device employs the forwarding information to organize cells into one or more groups. Advantageously, this architecture allows highly pipelined memory access processing.

According to another aspect of the present invention, a method is provided for forwarding data through a network device. A first port interface of the network device receives a packet. The first port interface transfers a cell, including data from the packet and forwarding information associated with the packet, to an intermediate device. The intermediate device outputs the cell to a memory via a data path and outputs the forwarding information to a queue managing device via a separate and independent path. Based upon the forwarding information, the queue managing device determines an output queue with which to associate the cell. Subsequently, the cell is transferred to a second port interface device associated with the output queue. Advantageously, this approach allows the memory access processing to be partitioned into two independent processes with overlapping execution. For example, the first process may make a determination as to which output queue a cell is to be associated while a second process may concurrently perform the actual writing and/or reading of cells to/from the memory.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 4 illustrates a cell header format according to one embodiment of the present invention.

DETAILED DESCRIPTION OF THE INVENTION

A method and apparatus for increasing the throughput and forwarding rate of a switch fabric is described. Using the teachings of the present invention, switch fabric processing may be more highly pipelined by providing forwarding control information associated with a cell to the switch fabric before a queuing decision is required. In this manner, the switch fabric processing may be partitioned into two independent processes with overlapping execution. By way of example, a first process may make a determination as to which logical output queue a cell is to be associated while a second process may concurrently perform the actual writing and reading of cells to/from the switch memory.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software. Importantly, while embodiments of the present invention will be described with reference to an Ethernet switch, the method and apparatus described herein are equally applicable to other types of network devices, such as routers, bridges, and the like.

An Exemplary Switching Device Architecture

Figure 2:
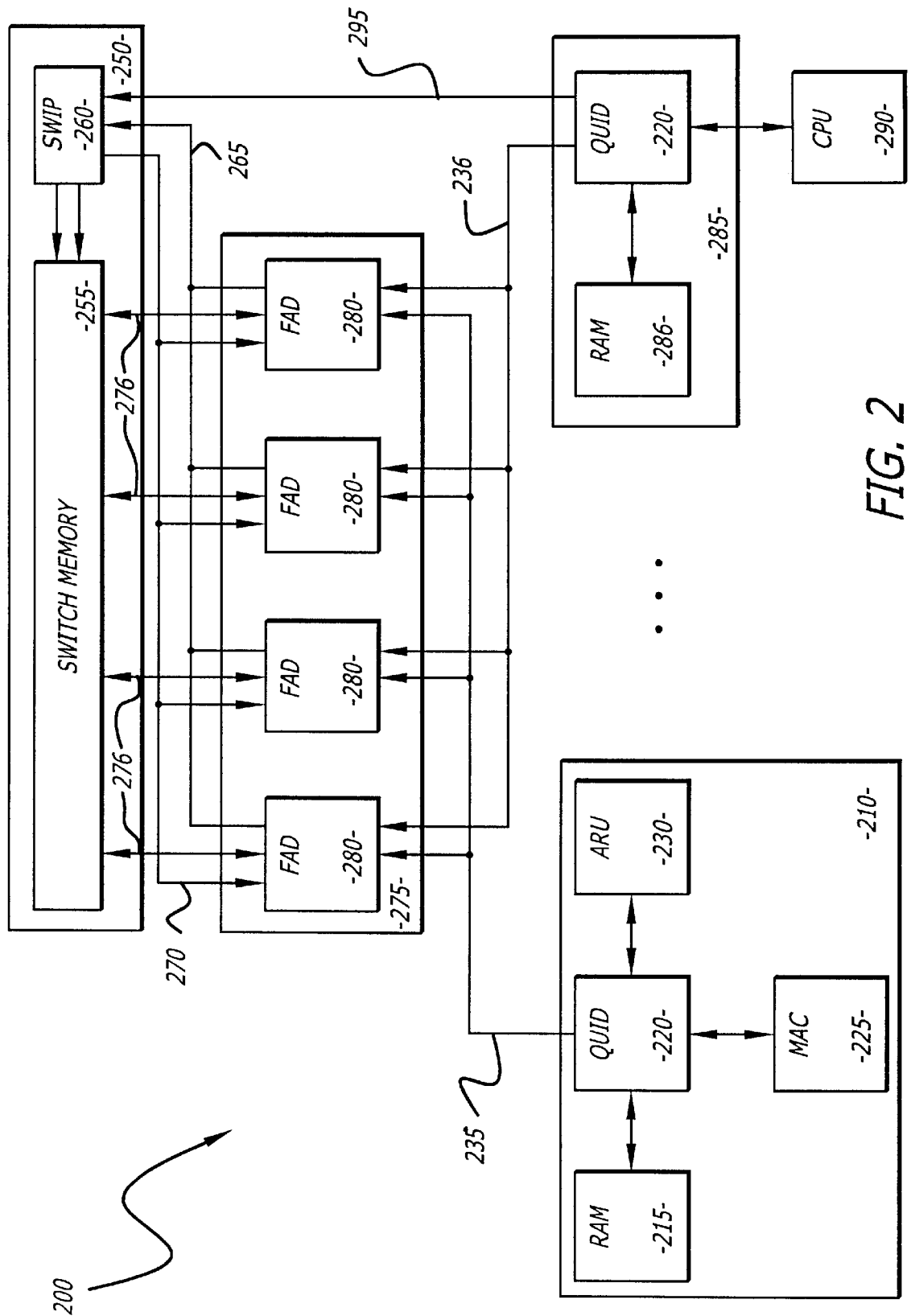
FIG. 2 is a block diagram of a packet forwarding device according to one embodiment of the present invention.

An overview of the architecture of a network device, e.g., switching device 200, in which an embodiment of the present invention may be implemented is illustrated by FIG. 2. According to the embodiment depicted, switching device 200 is an output buffered, shared memory switch.

Starting at a high level, switching device 200 includes a plurality of input/output (I/O) interfaces 210, e.g., I/O slots, coupled in communication with a switch core. The switch core comprises a switch fabric 250 and a fabric interface 275. Also coupled to the switch core via interface 285 is a central processing unit (CPU) 290 which may facilitate management of forwarding and filtering databases of the I/O interfaces 210.

Packets enter the switching device 200 via one of the plurality of I/O interfaces 210. The inbound packet data is provided by the I/O interface 210 to the fabric interface 275 which steers the data through the switch fabric 250. When the packet data exits the switch fabric 250 it passes again through fabric interface 275 and ultimately to one or more I/O interfaces 210 from which the packet data is to be transmitted. The I/O interfaces 210 are coupled to the switch core though a bus interface 235 (also referred to as the "switch tap", or "tap bus"). The switch tap 235 moves packet data between the fabric interface 275 and the I/O interface 210. While for convenience, only one I/O interface 210 has been depicted, it should be appreciated the tap bus 235 may comprise a plurality of point-to-point buses coupling each I/O interface 210 to the fabric interface 275. The fabric interface 275 may be thought of conceptually as a large multiplexer (MUX)/demultiplexer (demux) with storage. The fabric interface 275 muxes the tap buses 235 into a bus 276 coupled to the switch fabric 250. Forwarding control bits from the packet data are also presented by the fabric interface 275 to the switch fabric 250 to facilitate cell queuing. The switch fabric 250 includes a switch memory 255 and a switch processor (SWIP) 260. The SWIP 260 organizes the packet data read into the switch memory 255 by associating the packet data with one of a plurality of output queues. Additionally, the SWIP 260 controls the flow of data between the fabric interface 275 and the switch memory 255 and the flow of data between the fabric interface 275 and the I/O interfaces 210.

Referring again to the I/O interfaces 210, each may include one or more Port Interface Devices (PIDs), such as a Quad-port Interface Device (QUID) 220. The I/O interfaces 210 may each additionally include one or more Media Access Controllers (MACs) 225, Address Resolution Units (ARUs) 230, and memories 215. In one embodiment, one or more of the MACs 225 comprise 84C301 Seeq Quad 10/100 MAC devices which may support up to four 10/100 Megabit per second (Mbps) ports (not shown). While, for the sake of explanation, (CSMA/CD) is assumed to be the medium access method employed by the MACs 225, it is appreciated that the MACs 225 may operate according to other communication protocols, such as the well-known Fiber Distributed Data Interface (FDDI) or Asynchronous Transfer Mode (ATM) communication protocols.

In the present embodiment, packets are forwarded among QUIDs 220 through the switch core in the form of fixed-length cells. The QUID 220 fragments inbound packets (i.e., those received from the MAC 225) prior to providing them to the fabric interface 275 and performs reassembly upon outbound cells (i.e., those received from the fabric interface 275). As packets are read from the MAC 225, forwarding control information necessary for steering the packet through the switch fabric 250 to the QUID 220 at which the packet will exit (e.g., the egress PID) may be prepended and/or appended to packets and/or the associated fixed-length cells by the ingress PID (e.g., the QUID 220 upon which a particular packet is received). The forwarding control information may also include information indicating the need for certain other packet/cell processing. For instance, a multicast flag may be provided in the cell header to cause the egress PID to replace the source MAC address for IP Multicast routed packets. An exemplary cell header format is described below.

The ingress PID interfaces with its associated ARU 230 to acquire the forwarding control information associated with a packet. As the QUID 220 performs packet fragmentation, an address look-up request, which contains the destination Network layer address to which the packet is addressed (e.g., the destination Internet Protocol (IP) address), may be sent to the ARU 230. Upon completion of the address look-up, the ARU 230 returns the forwarding control information associated with the packet. Typically, the ARU 230 processes address look-up requests in the order received. The ARU processing may include performing Layer 2, e.g., Media Access Control (MAC) layer, or Layer 3, e.g., Network layer, address look-up to determine the forwarding control information such as, the destination address (e.g., a multicast address or egress PID and egress port identifier pair). The forwarding control information may then be inserted into packet and/or cell headers or trailers before the cells are provided to the fabric interface 275.

According to one embodiment, the fabric interface 275 comprises a plurality of fabric access devices (FADs) 280. As described below, cells may be exchanged between the QUIDs 220 and the FADs 280 by handshaking with the SWIP 260. Each FAD 280 muxes the tap buses 235 coupled to the PIDs 210 into the bus 276 coupled to the switch memory 255. According to one embodiment, the FADs 280 each accept a slice of the tap bus width. For example, for a 32-bit tap bus 235 each FAD 280 would accept mutually exclusive 8-bit slices during tap bus cycles. Each FAD 280 may buffer a plurality of cells in either direction (e.g., transmit or receive). Additionally, FADs 280 include two separate and independent paths, e.g., data path 276 and control path 265, the former conveying cell data as a whole to the switch memory 255 and the latter providing to the SWIP 260 a subset of the data associated with a cell, such as the forwarding control information. Preferably, the data path 276 and the control path 265 are separate physical interfaces to the FAD 280 (e.g., a separate set of pins coupled to the switch memory 255 and SWIP 260, respectively). It is also preferable that the these interfaces be independent, meaning cell data from a first cell may be output over data path 276 while forwarding control information associated with a different cell may be output over control path 265. While in one embodiment the FADs 280 are configured to concurrently output forwarding control information onto the independent control path 265 as they output cell data onto the data path 276, in alternative embodiments it may be advantageous to have these interfaces operate in different clock domains.

Importantly, the availability of multiple cells combined with the separate interfaces 265, 276 provided by the FADs 280 provide the SWIP 260 with the opportunity to access a cell's forwarding control information before the cell needs to be stored in switch memory 255. As a result of these features, therefore, switch fabric processing may be more highly pipelined. For example, in one embodiment, the FADs 280 may each buffer at least three cells in the receive direction, thereby allowing at least three processing steps to be performed concurrently. That is, during a single clock cycle, one of the QUIDs 280 may transfer a first cell or portion thereof into a first buffer, the SWIP 260 may access the forwarding control information associated with a second cell stored in a second buffer, and the FAD 280 may transfer a third cell from a third buffer to the switch memory 255. The pipelined processing enabled by the FAD-SWIP control path interface will be described further below.

Returning to the switch fabric 250, in one embodiment the switch memory 255 is implemented with a 64K×256 pipelined synchronous static random access memory (SRAM). However, it is appreciated that various other types of random access memory (RAM) may be employed to provide for the temporary storage of cells received from the fabric interface 275. Above, it was mentioned that the SWIP 260 controls the movement of cells between the fabric interface 275 and the QUIDs 220 and manages the storage and retrieval of data to and from the switch memory 255. Many different handshaking mechanisms are available for coordinating the exchange of cells between the QUIDs 220 and the FADs 280 and between the FADs 280 and the switch memory 255. For instance, the SWIP 260 may present read and write ready signals and receive read and write enable signals to control the flow of cells. Various alternative approaches will no doubt be recognized by those of ordinary skill in the art.

In addition, the SWIP 260 maintains a plurality of output queues. In one embodiment, the switch memory 255 serves as a pool of buffers which are logically associated with one or more predetermined groups by the SWIP 260. For example, data structures and head and tail queue pointers into the switch memory 255 may be maintained and manipulated by the SWIP 260 as cells are stored and retrieved from the switch memory 255. Various mechanisms are available for organizing the cells into groups for output. In one embodiment, the number of output queues is twice the number of switch taps 235 plus two. In this example, high and low priority queues are maintained for each switch tap 235 and a high and low priority queue are maintained for cells destined for multiple taps (e.g., multicast).

It is appreciated that each of the functional units described above may be implemented with hard wired circuitry, Application Specific Integrated Circuits (ASICs), by causing a processor to execute instructions, or a combination thereof. Importantly, the present invention is not limited to a particular implementation of these functional units.

Packet Processing

Figure 3:
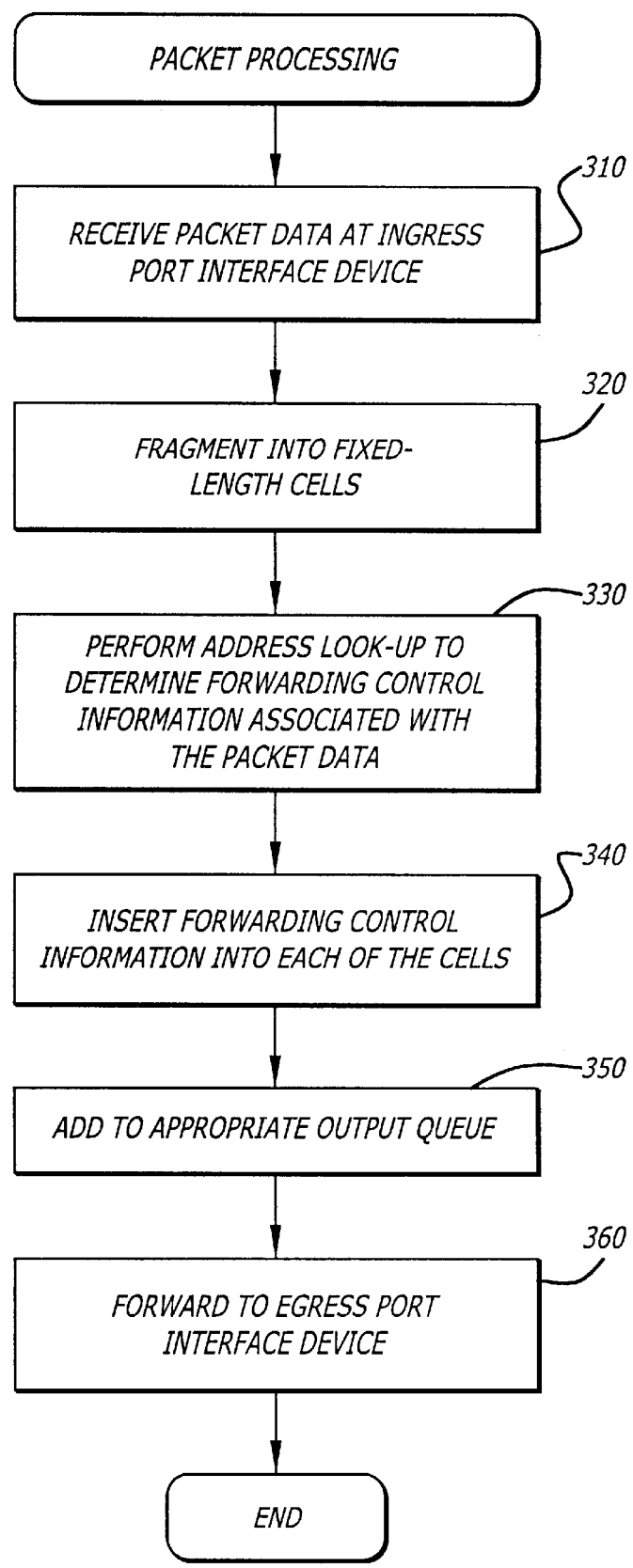
FIG. 3 is a flow diagram illustrating packet processing according to one embodiment of the present invention.

Having described an exemplary packet forwarding device, packet processing will now be described with reference to FIG. 3. At step 310, inbound packet data is received at the ingress port interface device. At step 320, the packet data is fragmented into fixed-length cells. According to one embodiment of the present invention, fragmentation includes the QUID 220 reading packet data a cell payload at a time from the MAC 225. In alternative embodiments, packet buffering may be provided in the QUID 220 and more or less than a cell payload of packet data may be read from the MAC 225. At step 330, forwarding control information associated with the packet data is determined. A portion of the packet data may be employed by the ARU 230, for example, to retrieve forwarding control information from a forwarding table. The forwarding control information contains information useful for steering the cells through the switch core. At step 340, the QUID 220 adds the forwarding control information to cells before they are dispatched to the switch core. As indicated above, this information may be prepended in a header, appended in a trailer or distributed among a header and a trailer. At step 350, the cells are associated with the appropriate output queue. In one embodiment, the cells are temporarily buffered in an intermediate device, such as fabric interface 275 before reaching the switch fabric 250. A memory management device, such as SWIP 260, reads forwarding control information associated with a first cell while concurrently writing cell data associated with a second cell into switch memory 255. During the next clock cycle, after memory management device has determined the appropriate output queue with which to associate the first cell it may be written to the switch memory 255.

Cell Encapsulation

As described earlier, in one embodiment, the port interface devices fragment inbound packets into fixed-length cells. Each cell may include 60 bytes of payload and a cell header. FIG. 4 illustrates a cell header format that may be used for encapsulation of packet data within cells according to one embodiment of the present invention. In this example, a four-byte cell header 400 is appended to each cell by the ingress port interface device. Assuming four FADs 280 accept equal sized, mutually exclusive slices of the cell header 400, each FAD 280 receives one byte. A first byte 410 of the cell header 400 may be buffered in a first FAD 280. A second byte 420 is accepted and buffered in a second FAD 280. A third FAD 280 buffers a third byte 430 and the last byte 440 is buffered in a fourth FAD 280.

As a feature of this embodiment, the bits of the cell header 400 have been arranged so as to allow control information required by the SWIP 260 to be conveniently accessed over control path 265, for example, from the same three bits (5–7) of each FAD 280.

Cells are associated with output queues by the SWIP 260 based upon one or more portions of their forwarding control information. In this example, the forwarding control information includes: (1) a destination address (i.e., cell header bits 5, 13, 14, 15, 21, 22, and 23); (2) a cell priority, i.e., cell header bit 7; and (3) a multicast flag, i.e., cell header bit 31. The multicast flag indicates whether or not the cell is to be forwarded from the output queue to a single PID (e.g., in the case of unicast traffic) or potentially to multiple PIDs (e.g., in the case of multicast traffic). The multicast flag also indicates how the destination address bits are to be interpreted. When the cell is part of a multicast packet, the destination address may represent a multicast group. When the cell is part of a unicast packet, the destination address may be represented by a combination of the QUID number and the QUID port number, or either taken alone.

It is appreciated that more or less bits of forwarding control information may be employed depending upon the number and grouping of the output queues. Also, in alternative embodiments, the header information, including the forwarding control information may be distributed between a cell header and a cell trailer. Additionally, it is appreciated different sized headers or trailers may be employed or all the information may be placed in either a cell header or a cell trailer without using the other. Further, other arrangements of the bits and distributions across the FADs 280 may be employed.

Pipelined Processing

Figure 1:
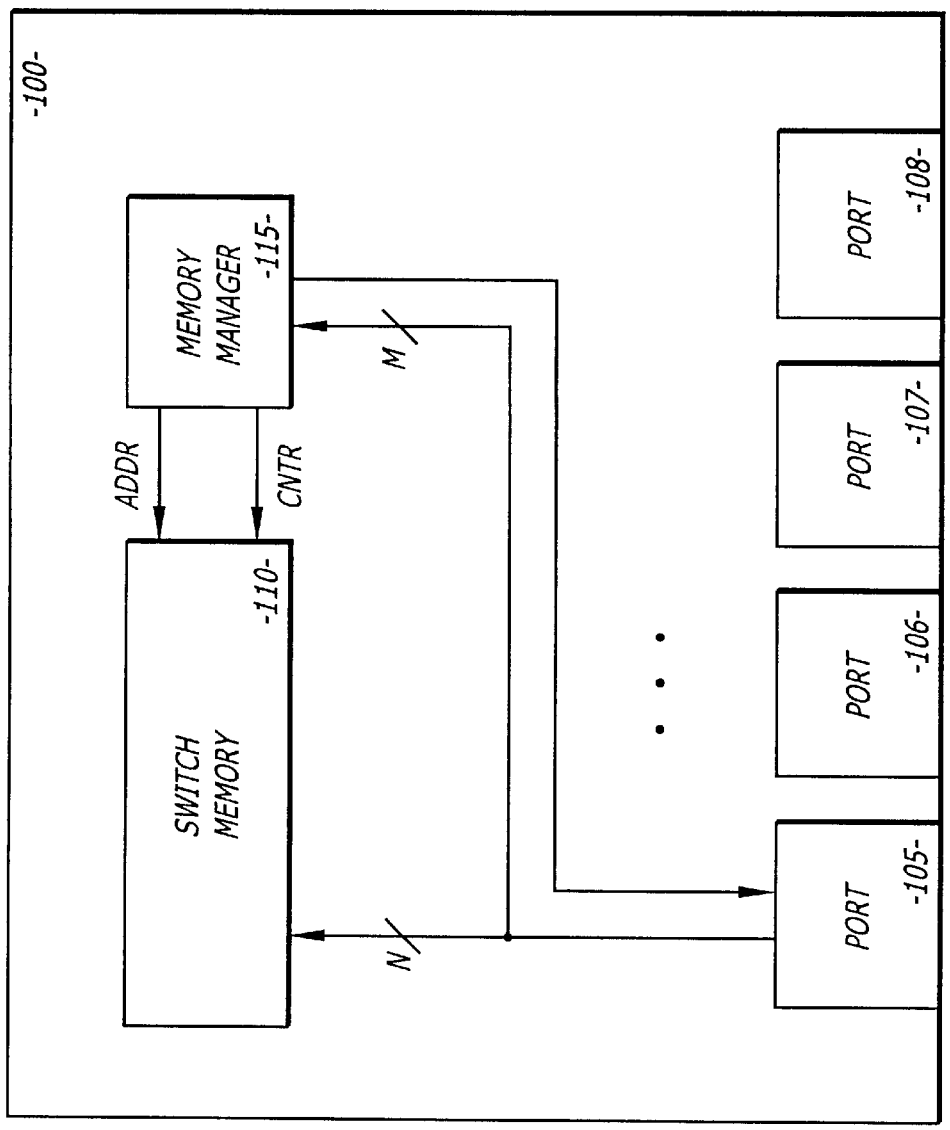
FIG. 1 is a simplified block diagram which illustrates one approach for managing access to a switch memory.
Figures 5A, 5B:
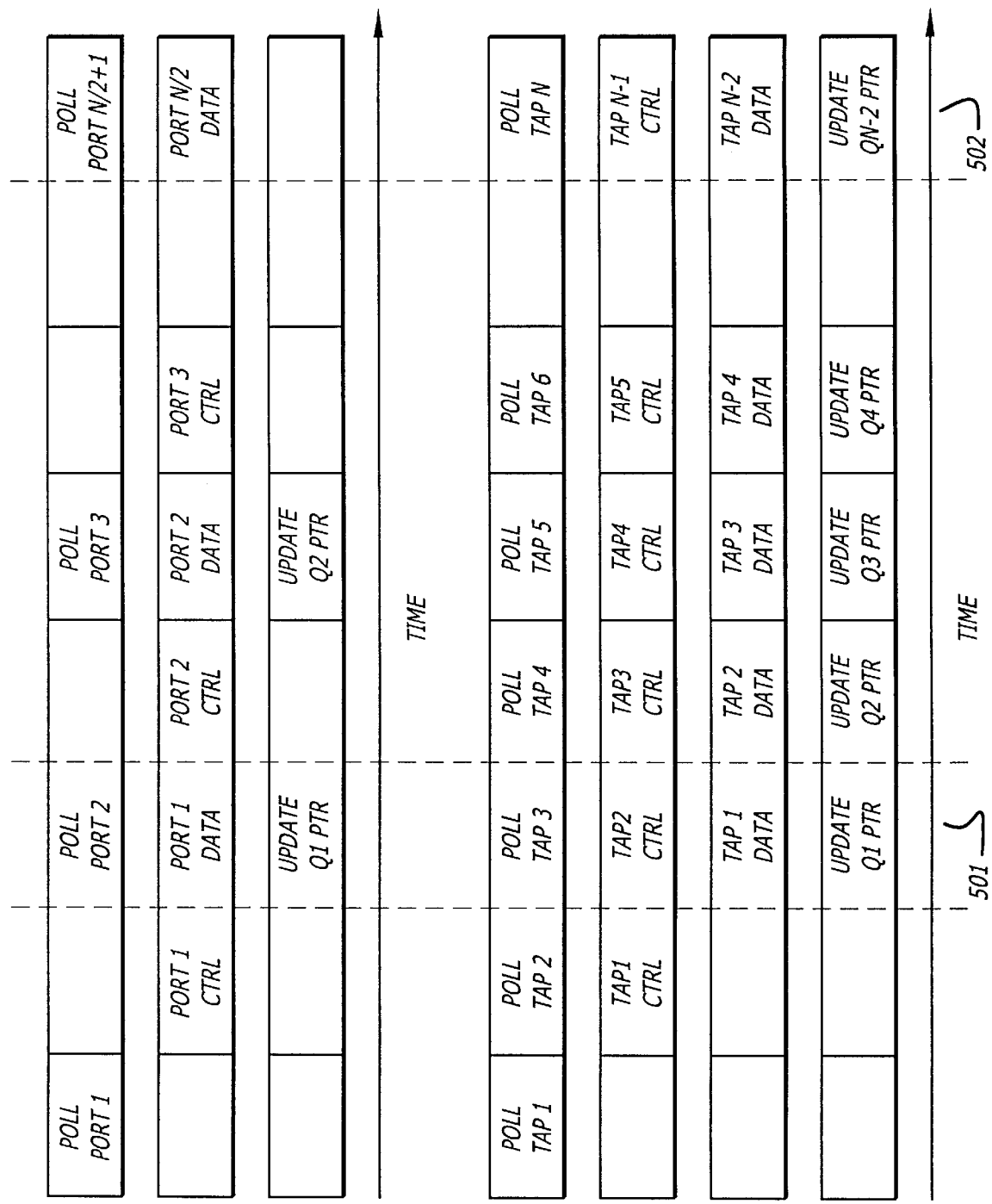
FIGS. 5A and 5B illustrate exemplary pipelined processing for the switches of FIG. 1 and FIG. 2, respectively.

FIGS. 5A and 5B are useful for comparing exemplary pipelined processing for the switches of FIG. 1 and FIG. 2, respectively. Casual observation reveals much more idle time in the execution pipeline of FIG. 5A. This is due to the fact that both control and data must be accessed over the same bus by memory manager 115. In contrast, the separate and independent buses 265, 276 allow more concurrency to be achieved. For example, at time 501, switch 100 may poll a first port to see if data is available, read data from a second port into the switch memory 110, and perform internal queue pointer manipulations. At time 501, switch 200 may poll a tap to determine if data is available, concurrently read forwarding control information over control path 265 and read cell data into switch memory 255 over data path 276, and perform queue pointer manipulations. Importantly, due to the early availability of forwarding control information, at time 502, switch 200 will have transferred nearly twice as much data through the switch fabric as switch 100.

Alternative Embodiments

Many alternative embodiments are contemplated by the assignee of the present invention. For example, in alternative embodiments, one or more of the I/O interfaces 210 may include Gigabit Interface Devices (GIDs) rather than the QUIDs 220 described above. The GIDs may each operate at a half-duplex data transfer rate of 1 Gigabit per second (Gbps), according to the IEEE draft standard 802.3z/D3.1.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of forwarding a packet from an ingress port interface to an egress port interface, the method comprising the steps of:
   receiving packet data at an ingress port interface;
   adding forwarding control information to the packet data;
   buffering the packet data in an intermediate device, the intermediate device including
      a data interface and a separate and independent control interface;
   accessing the forwarding control information via the separate and independent control interface,
   determining with which output queue to associate the packet data based upon the forwarding control information;
   reading the packet data into a memory via the data interface; and
   transferring the packet data from the output queue to a corresponding egress port interface.

2. The method of claim 1, wherein the forwarding control information includes destination information, the method further comprising the step of determining with which output queue to associate the packet data based upon the destination information.

3. The method of claim 2, wherein the destination information comprises information indicative of the egress port interface.

4. The method of claim 2, wherein the destination information comprises information indicative of a multicast group.

5. The method of claim 1, wherein the forwarding control information includes information indicative of a priority associated with the packet data, the method further comprising the step of determining with which output queue to associate the packet data based upon the priority.

6. The method of claim 1, wherein the forwarding control information includes a multicast flag indicating whether or not the packet data is associated with a multicast packet, the method further comprising the step of determining with which output queue to associate the packet data based upon the multicast flag.

7. A method of steering a packet through a packet forwarding device, the method comprising the steps of:
   receiving packet data at an ingress port interface;
   fragmenting the packet data into fixed-length cells; and
   queuing each of the fixed-length cells for transmission from an egress port interface by
      inserting forwarding control information into the cell,
      buffering the cell in an intermediate device, and
      adding the cells to an output queue associated with the egress port interface
         by accessing the forwarding control information from the cell via a separate and independent control interface of the intermediate device, determining with which output queue to associate the cell based upon the forwarding control information, and transferring the cell into a memory via a data interface of the intermediate device.

8. The method of claim 7, wherein the forwarding control information includes destination information, the method further comprising the step of determining with which output queue to associate the cell based upon the destination information.

9. The method of claim 8, wherein the destination information comprises information indicative of the egress port interface.

10. The method of claim 8, wherein the destination information comprises information indicative of a multicast group.

11. The method of claim 7, wherein the forwarding control information includes information indicative of a priority associated with the cell, the method further comprising the step of determining with which output queue to associate the cell based upon the priority.

12. The method of claim 7, wherein the forwarding control information includes a multicast flag indicating whether or not the cell is to be multicast, the method further comprising the step of determining with which output queue to associate the cell based upon the multicast flag.

13. The method of claim 7, wherein the step of accessing the forwarding control information from the cell is performed during a first clock cycle and the step of transferring the cell into a memory is performed during a second clock cycle.

14. The method of claim 7, further comprising the step of pipelining the processing of a first cell and a second cell.

15. The method of claim 14, wherein the step of pipelining the processing of a first cell and a second cell includes the steps of:

transferring a first cell into the memory via the data interface during a first clock cycle; and accessing forwarding control information associated with a second cell during the first clock cycle.

16. A packet forwarding device comprising:

a plurality of port interface devices (PIDs) each configured to fragment packets into a plurality of cells, each of the plurality of cells containing cell data, a portion of which serves as forwarding control information, wherein one or more of the plurality of PIDs comprise quad-port interface devices (QUIDs);

memory access circuitry coupled to each of the PIDs to receive cell data, the memory access circuitry including a data interface that outputs the cell data, and an independent control interface that outputs the forwarding control information;

a memory coupled to the data interface of the memory access circuitry to temporarily store the cell data; and a management device coupled to the independent control interface of the memory access circuitry to receive the forwarding control information, the management device using the forwarding control information to organize cells into one or more groups.

17. The packet forwarding device of claim 16, wherein one or more of the plurality of PIDs comprise gigabit interface devices (GIDs).

18. A switch comprising:

an input/output (I/O) interface configured to add forwarding control information to inbound packet data; and a switch core coupled to the I/O interface to receive data including the forwarding control information and the inbound packet data, the switch core including memory access circuitry configured to output the data received from the I/O interface onto a data path, the memory access circuitry further configured to concurrently output the forwarding control information onto a separate control path as it outputs the data onto the data path, a memory coupled to the data path, the memory temporarily storing the data received from the I/O interface, and a management device coupled to the separate control path, the management device maintaining a plurality of output queues and associating the data received from the I/O interface with one of the plurality of output queues based upon the data's forwarding control information.

19. The switch of claim 18, further comprising tap buses coupling each I/O interface with the memory access circuitry and wherein each of the plurality of output queues are associated with a corresponding tap bus.

20. A method of forwarding data through a network device, the method comprising the steps of:

receiving a packet at a first port interface of a network device;

the first port interface transferring a cell to an intermediate device, the first cell comprising data from the packet and forwarding control information associated with the packet, the intermediate device outputting the cell to a memory via a data path and outputting the forwarding control information to a queue managing device via a separate and independent control path;

the queue managing device determining an output queue with which to associate the cell based upon the forwarding control information; and transferring the cell to a second port interface device associated with the output queue, wherein the forwarding control information includes information identifying the second port interface.

21. The method of claim 20, wherein the forwarding control information includes information indicative of a multicast group.

22. The method of claim 20, wherein the step of the intermediate device outputting the cell to a memory via a data path and outputting the forwarding control information to a queue managing device via a separate and independent control path is performed during a the same clock cycle.

* * * * *